US010020847B2

(12) United States Patent
Brahami et al.

(10) Patent No.: US 10,020,847 B2
(45) Date of Patent: Jul. 10, 2018

(54) NFC DEVICE AND CONNECTION SYSTEM OF NFC DEVICES

(71) Applicant: FAMOCO, Paris (FR)

(72) Inventors: Lionel Brahami, Gradignan (FR); Nicolas Berbigier, Saint-Gilles (BE)

(73) Assignee: FAMOCO, Paris (FR)

( * ) Notice: Subject to any disclaimer, the term of this patent is extended or adjusted under 35 U.S.C. 154(b) by 0 days.

(21) Appl. No.: 14/949,015

(22) Filed: Nov. 23, 2015

(65) Prior Publication Data

US 2016/0080039 A1    Mar. 17, 2016

Related U.S. Application Data

(63) Continuation-in-part of application No. 14/358,525, filed as application No. PCT/EP2012/072784 on Nov. 15, 2012, now abandoned.

(30) Foreign Application Priority Data

Nov. 15, 2011 (FR) ...................... 11 03456

(51) Int. Cl.
*H04B 5/00* (2006.01)
(52) U.S. Cl.
CPC ......... *H04B 5/0031* (2013.01); *H04B 5/0056* (2013.01)
(58) Field of Classification Search
USPC ............................................... 455/41.1, 41.2
See application file for complete search history.

(56) References Cited

U.S. PATENT DOCUMENTS

| 5,343,519 A * | 8/1994 | Feldman ............... H04M 1/275 379/126 |
| 8,538,892 B2 | 9/2013 | Humpleman et al. |
| 2003/0079127 A1* | 4/2003 | Bidan .................. G06Q 20/341 713/172 |

(Continued)

FOREIGN PATENT DOCUMENTS

| EP | 1959332 A1 | 8/2008 |
| WO | WO-2009148980 A2 | 12/2009 |

OTHER PUBLICATIONS

"Vx1i Mini Mobile Phone Review", Mar. 20, 2010 (Mar. 20, 2010), XP055056609, Retrieved from the Internet: URL:http://huestones.co.uk/node/205 [retrieved on Mar. 14, 2013]; 4 pages.

(Continued)

*Primary Examiner* — Nay A Maung
*Assistant Examiner* — Erica Fleming-Hall
(74) *Attorney, Agent, or Firm* — Harness, Dickey & Pierce, PLC

(57) ABSTRACT

The present device aggregates all kinds of contactless services such as credit card, loyalty card, micro-payment, discount card, transport card, access control, e-ticket, parking, etc. An NFC (Near Field Communication) device comprises a host CPU, a memory, a GPRS modem controlled by the CPU to access Internet, a SIM holder, an antenna and a battery. The NFC device is shaped as a credit card and it also includes a touch-screen, able to implement technical functionalities to operate contactless services, visualize his ticket/coupon and consult the latest transaction, a secure element to store and execute the contactless applications, and a ST controller connected to Host CPU and to the SE.

20 Claims, 3 Drawing Sheets

(56) References Cited

U.S. PATENT DOCUMENTS

| | | | |
|---|---|---|---|
| 2005/0027543 A1* | 2/2005 | Labrou | G06Q 20/02 |
| | | | 705/26.35 |
| 2006/0213972 A1 | 9/2006 | Kelley et al. | |
| 2006/0266822 A1 | 11/2006 | Kelley et al. | |
| 2009/0291634 A1* | 11/2009 | Saarisalo | H04M 1/72527 |
| | | | 455/41.1 |
| 2010/0044444 A1* | 2/2010 | Jain | G06K 7/10237 |
| | | | 235/492 |
| 2010/0081374 A1* | 4/2010 | Moosavi | G06K 7/0008 |
| | | | 455/41.1 |
| 2010/0299527 A1 | 11/2010 | Arunan et al. | |
| 2011/0093318 A1 | 4/2011 | Guday et al. | |
| 2012/0123935 A1* | 5/2012 | Brudnicki | G06Q 20/20 |
| | | | 705/41 |
| 2012/0124394 A1* | 5/2012 | Brudnicki | G06F 21/71 |
| | | | 713/193 |
| 2012/0238207 A1* | 9/2012 | Marcovecchio | H04L 63/0492 |
| | | | 455/41.1 |
| 2013/0029685 A1* | 1/2013 | Moshfeghi | G01S 19/48 |
| | | | 455/456.1 |
| 2013/0090073 A1* | 4/2013 | Zhu | H04B 5/0081 |
| | | | 455/90.2 |
| 2013/0109307 A1* | 5/2013 | Reisgies | H04L 63/08 |
| | | | 455/41.1 |
| 2013/0124346 A1* | 5/2013 | Baldwin | G06Q 20/322 |
| | | | 705/16 |
| 2013/0303084 A1* | 11/2013 | Narendra | H04M 1/673 |
| | | | 455/41.1 |
| 2014/0137197 A1* | 5/2014 | Lazaridis | H04L 63/0492 |
| | | | 726/3 |

OTHER PUBLICATIONS

Roland, Michael et al.; "Security Vulnerabilities of the NDEF Signature Record Type;" IEEE Computer Society—2011 Third International Workshop on Near Field Communication, Feb. 22, 2011; pp. 65-70.

* cited by examiner

NFC DEVICE AND CONNECTION SYSTEM OF NFC DEVICES

CROSS-REFERENCE TO RELATED APPLICATIONS

This application is a Continuation-in-Part of U.S. patent application Ser. No. 14/358,525, filed on May 15, 2014, which is a U.S. National Phase Entry of International Application No. PCT/EP2012/072784, filed on Nov. 15, 2012, which claims priority to French Patent Application Serial No. 11/03456, filed on Nov. 15, 2011, all of which are incorporated by reference herein.

BACKGROUND

The invention relates to a NFC (Near Field Communication) device, shaped as a credit card with a touch-screen and able to implement technical functionalities, and further relates to a connection system of NFC devices.

NFC technology development in the mobile communication field is becoming integrated with contactless radio frequency identification and interconnectivity. For example, the functions of the card reader, the induction card and peer-to-peer networking are now integrated onto a single chip. NFC technology also involves identification and data exchanges with compatible devices within a short distance by inductive coupling of radio frequency. In particular, the NFC mobile phone allows short distance wireless communication and achieves a plurality of functions: electronic payment, tag reading, tickets system and data download.

SUMMARY

Aggregation of more and more functions presents compatibility problems. A goal of the disclosed device is to aggregate all kinds of contactless services, such as credit card, loyalty card, micro-payment, discount card, transport card, access control, e-ticket, parking, etc.

The device is connected to mobile Internet through a GPRS connection, which lets a user receive e-coupons and e-tickets "over the air", top-up (recharge) an e-wallet or extend the validity of an e-transport or e-parking card, without having to line up at a cashier. The touch-screen lets the user operate the service, visualize his or her ticket/coupon, consult the latest transaction, and so forth. The NFC device has a secure element (SE) that stores a contactless application. The Secure Element is a smartcard, like a microcontroller, that stores and executes an application called a Cardlet. Each Cardlet implements the contactless service.

Through mobile Internet connectivity, NFC devices are connected to a backend server. The backend server manages the downloading of applications to the NFC device and onto the secure element. Through the backend server, when a new user subscribes to a service, a contactless application is downloaded to the secure element and the user interface is downloaded to the subscribing user's NFC device.

The device is powered by a rechargeable battery. However, the device can still operate (in battery-off mode) when the battery is depleted. In this battery-off mode the device is powered by a magnetic induction field issued from the point of sale system (POS). In that mode, the screen and GPRS connection are not functional, but the contactless transaction can still be performed.

DETAILED DESCRIPTION OF THE PREFERRED EMBODIMENTS

Figure 1:
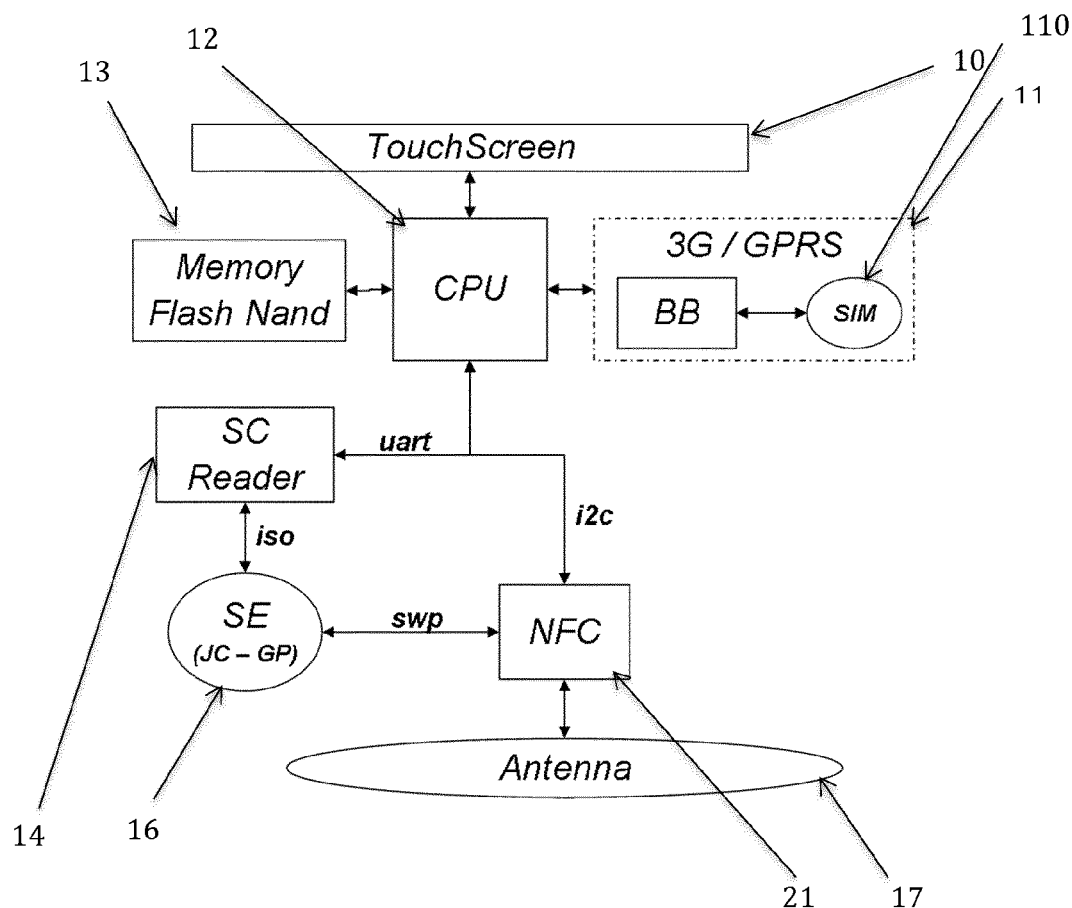
FIG. 1 describes the main device functions of an exemplary near field communication (NFC) device according to the invention.

As shown in FIG. 1, an example of a near field communication (NFC) device according to the invention is built around a CPU/MCU 12 with NAND flash memory and RAM 13. The touch-screen 10 is made of a color LCD display and an associated touch-panel. The device has Internet access through a GSM/GPRS modem 11. The GPRS modem is controlled by CPU/MCU 12. GPRS Modem 11 is connected to CPU/MCU 12, and can be powered on/off by CPU/MCU's GPIO. A SIM/miniSIM holder 110 will receive the SIM needed for GPRS/3G communication.

The NFC device is powered by NFC FrontEnd controller 21. The NFC FrontEnd controller 21 is connected to Host CPU/MCU 12. NFC FrontEnd controller 21 is then connected to a secure element 16.

The NFC device receives NFC radio-frequency signals though antenna 17, preferably designed as an external board, or as a wire wrapped and embedded into the device case. A specific power management module powers up the NFC device. In order to take advantage of the battery off mode, the secure element 16 power pin is connected to a pin of the NFC FrontEnd controller 21. The NFC FrontEnd controller 21 is connected to the battery in order to have the NFC feature available even if the device is powered off.

In order to let host CPU/MCU 12 access the secure element 16 directly, the device uses a dedicated chip, a smartcard (SC) Reader 14. The smartcard reader 14 is connected to the secure element 16 using a standard ISO 7816 connection, the smart card reader is also connected to the host CPU/MCU 12. As the smartcard reader 14 is a generic micro-controller, a special firmware is designed to interface the Host CPU/MCU 12.

The NFC device is powered by a battery and recharged from a USB connector. An LED indicates when the device is charging and when full charge level is reached. The hardware provides battery charge level information.

Figure 2:
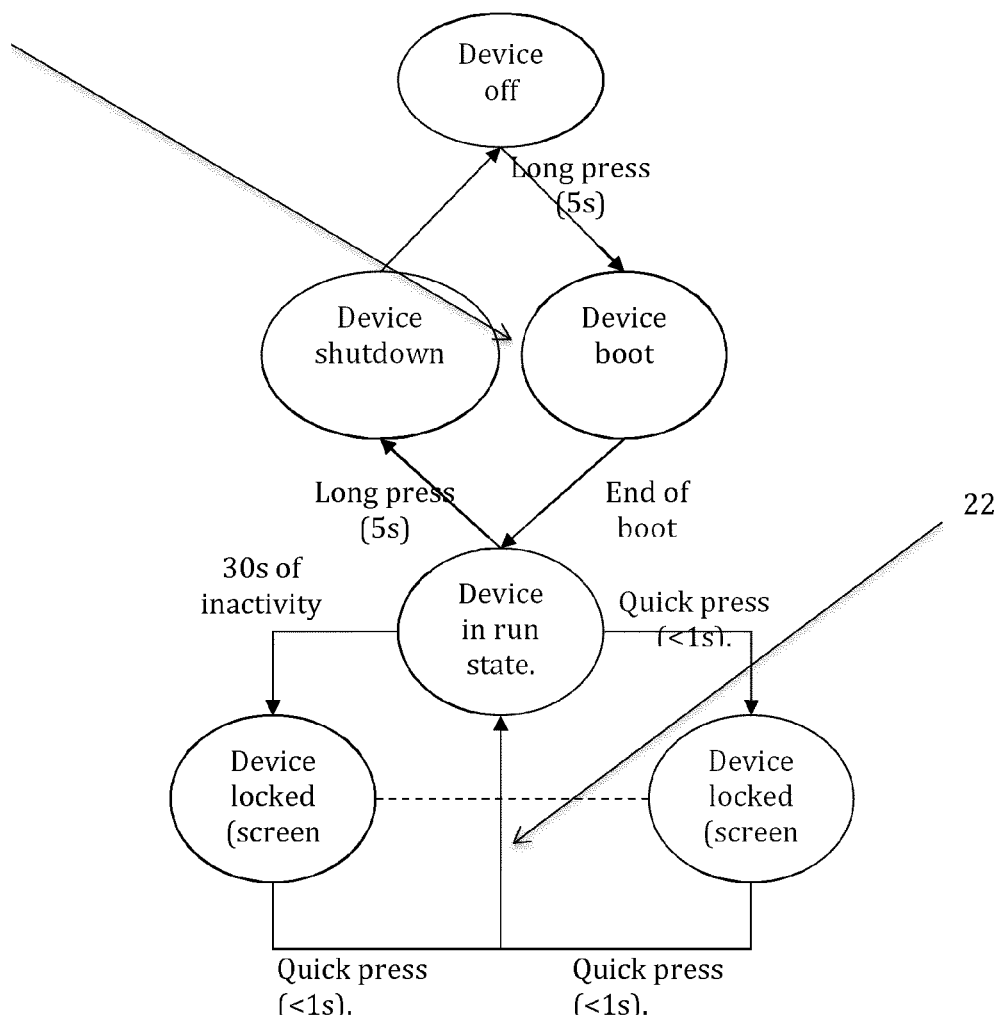
FIG. 2 describes the power on/off life cycle of the NFC device.

FIG. 2 describes an example of the NFC device's power on/off life cycle. A two-state button 21 located on the top (or on the side) of the device powers the device on and off, also serving to lock and unlock the device. The lifecycle is described in FIG. 2.

Figure 3:
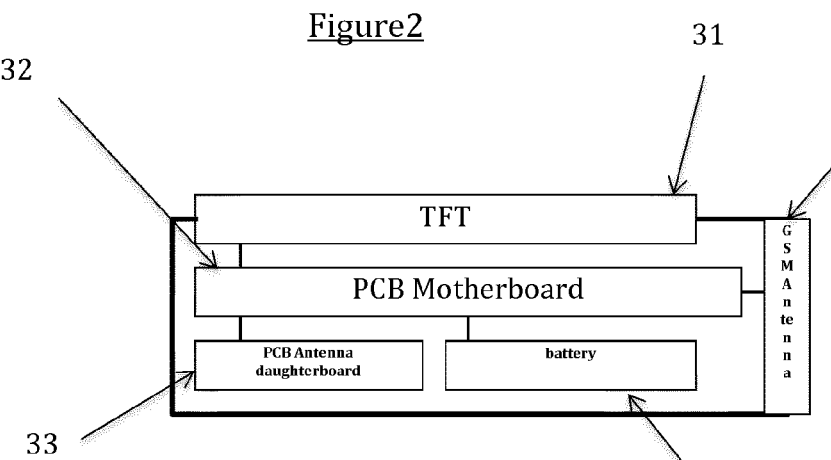
FIG. 3 depicts a cross section of the NFC device.

The device cross section is illustrated in FIG. 3. It comprises:

a LCD/TP layer 31, connected to a Printed Circuit Board (PCB) motherboard 32, connected to a NFC antenna 33 and to a battery 34, and the GSM antenna 17 connected to the PCB motherboard 32.

Figure 4:
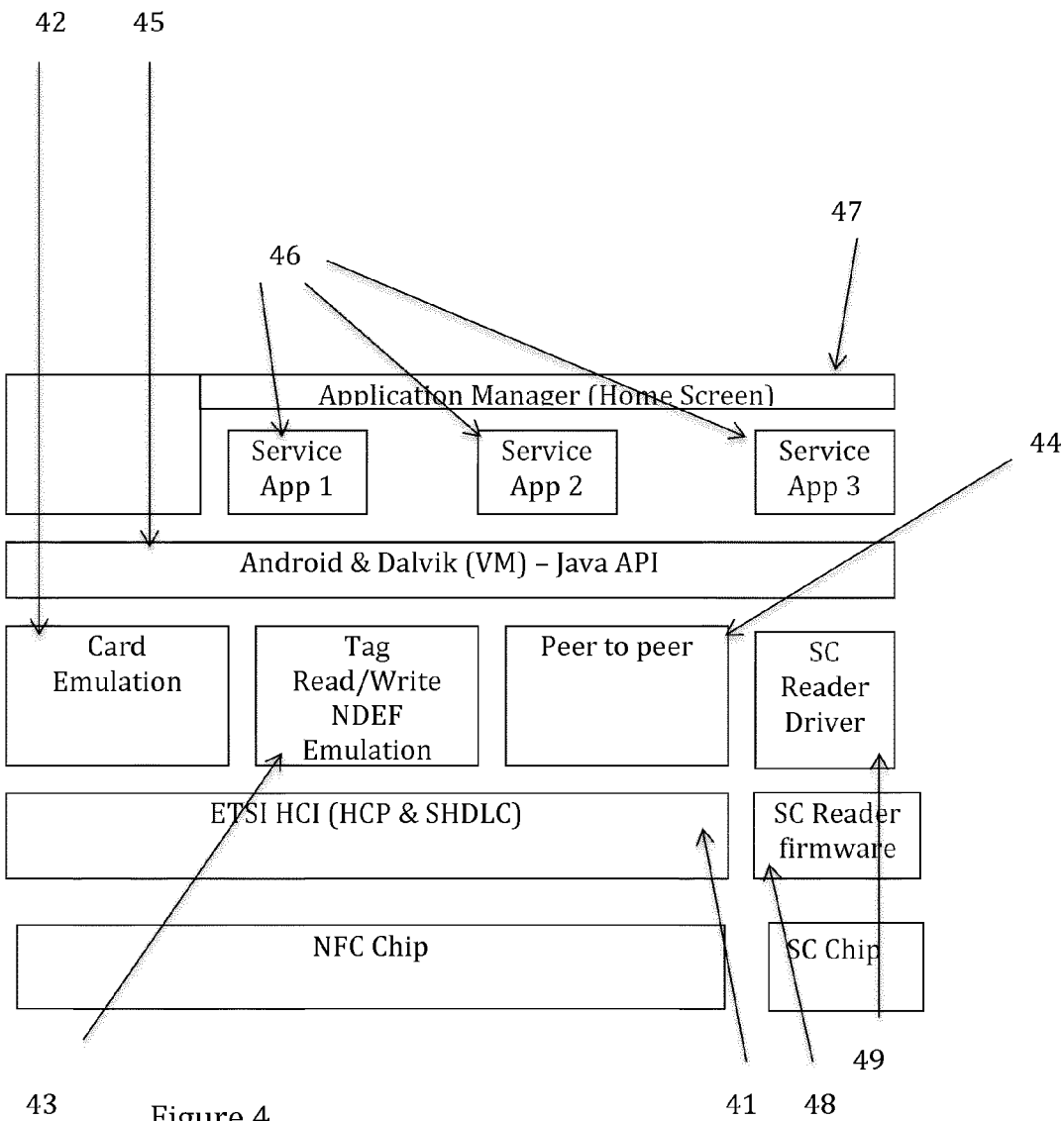
FIG. 4 depicts the software stack design of the NFC device.

The preferred device has credit card format (85 mm×54 mm) and is sized to fit the cabling and the above mentioned chips and feature components. The device is running custom software. The high level software stack design of the custom software is shown in FIG. 4.

The NFC stack is broken into two subcomponents:

a host controller interface (HCI) layer 41, which implements the protocol related to NFC Front-End controller.

a NFC Forum specification layer with a card emulation 42, NDEF Emulation 43 and peer-to-peer module 44. This layer implements NFC Forum specification.

This last layer provides specific application programming interfaces (APIs) 45 to let the service application control/access the NFC feature of the NFC Front-End controller.

The application layer consists of two kinds of components:

service applications 46 that implement a given service, like e-wallet, e-coupon wallet, etc.;

Service Application Manager (SAM) 47 that manages Service Application running on the board.

The smartcard (SC) reader firmware 48 interfaces the host CPU/MCU with the secure element 16 through an ISO7816 connection. The smartcard reader driver 49 provides the API to interface the Application Layer with the smartcard reader through the smartcard reader firmware 48.

Service Apps are under management of SAM-Home-Screen 47 (Service App manager). Service Apps are started or deleted through service app manager 47. The service app manager is started at device startup and is always running in the background. The user cannot close, kill or terminate the service app manager.

The service app manager maintains a list of Service Apps installed on the device and shows a "cover flow" with all Service App icons. The service app manager lets the user browse all Service Apps by icon and allows the user to launch or start the selected Service App. The service app manager monitors running Service Apps and brings itself to the front when the running Service App is terminated. (The SAM always remains running in the background).

A Service App can register with the SAM for NFC activity. The Service App will give the application identifier (AID) of the card application it is related to. When the point of sale (POS) unit sends data to that card application, the SAM will start the associated Service App. The SAM supports a read/write smart poster feature. When a user "taps" a smart poster, the SAM presents a pop-up dialog and performs the actions associated with the tag.

Tag associated actions are:

Trigger Service App launch;

Trigger Service App download;

Trigger Service App content download;

Download and render a predefined simple XML format to display text and image; and Send HTTP notification to the server.

One technical problem addressed by the disclosed technology is that portable communication devices, generally known as smartphones, contain a secure element with a key or other encryption information determined by the manufacturer. The users of third party applications want or need to ensure the payment data and other credentials are protected by another security control, which is different from the secure element.

As disclosed in the published patent application US20120124394 (which is incorporated by reference herein), a virtual secure element is used to fulfill the desire of uses for the third party application. This virtual secure element can be located on any memory accessible to the communication device and is managed by a card management system. This card management system tracks the issuers of all cards, coupons, access control and ticket data stored in the virtual secure memory as well as the secure element in the payment subsystem. This means that the virtual secure memory knows the key of the secure element and has access to the internal data of the secure element. This imposes a potential danger to the security of the system, since there is a possibility to invade the secure element via the virtual secure element.

To solve this problem, the patent application US20120124394 discloses that the virtual secure element may also be secured using a key or other encryption information that is stored in the secure element. In this case, in order to access the data stored within the virtual secure element, the card management system would need to access and obtain the key from the secure element. Again, in this embodiment, the card management system also has access to the internal data of the secure element.

It is important to find a method that has no need to access the internal data of the secure element. In addition, the key of the secure element is an inherent element assigned by the manufacturer. Certain third parties, e.g., a bank, it needs to have an independent key, which is not accessible by the manufacturer. Thus, the disclosed technology enables the joint use of the internal secure element (SE) and an external secure module, like service app manager (SAM) or cards in the same module. Thus these two levels of secure elements jointly guarantee the security of an application.

As illustrated in FIG. 1, in order to let the host CPU access the security element directly, the device uses a dedicated chip, a security card reader, which has its own key and which is connected directly to the security element with a standard ISO connection. As the security card reader is a generic micro-controller, a special firmware is designed to interface with the host CPU. The security card reader can activate and deactivate the security element. Furthermore, the security card reader can verify the active/non-active status of the security element without the need to access the inherent content and data stored in the security element.

In this sense there is a double level of security: internal security provided by the secure element and external security provided by the smartcard reader. The keys in the smartcard reader and keys in the secure element belong to two different identities. Firstly, the secure element contains its inherent keys, which are set by the manufacturer and which are responsible for providing the internal security of the smartphone device. Then the smartcard reader contains other keys, which are held only by the user, e.g., a bank. For authorizing payments and other transactions, the bank verifies the key in the smartcard reader.

At a first level, these two keys are independent in their functions in controlling the identification and access to this device. At a second level, the smartcard reader provides external control to operate the secure element in the sense that the smartcard reader can activate and deactivate the secure element without reading, verifying or modifying the content inside the secure element.

As illustrated in FIG. 4, the application layer consists of two kinds of components: service applications that implement a given service and the service application manager (SAM) that manages series applications running on the board. The smartcard reader firmware interfaces the host CPU/MCU with the secure element through an ISO connection. The smartcard reader driver provides an API to interface the application layer with the smartcard reader through the smartcard reader firmware. Thus, the secure element can activate and deactivate the SAM.

The security element can realize the authentication of the keys of the SAM, and diversification of symmetric keys of the SAM. Meanwhile, the SAM can contain the key for the payment, and the bank transaction data. A list of some possible application examples is given below:

1. Deploying SAM access and securing the SAM access at the same time: Banks or transport companies normally use the SAM to secure the transactions with credit cards or transport cards. The access to those SAMs is usually controlled with a code. However, storing the code on the applications of the file system in the host operation device is unsecure, as it is easily decrypted. The usage of an internal secure element to activate and to deactivate the SAM enables security.

2. Securing Device and device connectivity without involving the SAM: When an operator has deployed a payment or transportation scheme with its SAM, the operator still needs to cypher the communications between the devices. However, because the SAM contains the keys, this can be done with the use of the internal secure element and hence without the need to give access to the SAM.

3. Verify the authenticity of applications and binary: When deploying business applications on a mobile terminal, one is limited by the security of the operating system, e.g., Android. The internal secure element is used to sign the application's binary in order to ensure the security of the application.

4. Creating Dual Applications: Although deploying applications on a terminal is limited by the security of the operation system, a duplet application type can improve the security. This duplet application type consists of a couple of applications, one stored on the operating system (e.g., Android) as an Android application package (APK) and the other on the internal secure element as a Java Card application, with the business logic programmed in the secure element Java Card application.

5. Identifying Hardware: When transactions are made on a terminal, it is essential to identify in a secure way the hardware of the host making the transaction. Media access control (MAC), International Mobile Station Equipment Identity (IMEI), serial numbers and universally unique identifiers (UUID) are easily changeable. The internal security element allows a device to be identified. In addition, the security element can identify the unique mutual ID, the private and public key for the communication with a platform. Furthermore, the secure element can sign the communication, the application.

The invention claimed is:

1. A near field communication device comprising:
a host central processing unit or microcontroller unit;
a memory;
a general packet radio service modem controlled by the central processing unit or microcontroller unit to access the Internet;
a subscriber identification module holder;
an antenna;
a battery, the near field communication device being shaped as a credit card and further comprising a touch-screen adapted to operate:
contactless services;
visualize a ticket/coupon; and
consult the latest transaction or equivalent;
a secure element adapted to store and execute a contactless application;
a near field communication front-end controller connected to the central processing unit or microcontroller unit and to the secure element,
the near field communication device using a dedicated smartcard chip as an external secure module, the external secure module being connected to the secure element as an internal secure element, to realize two-level security;
in response to identifying the internal secure element, the external secure module operably activating the internal secure element via the dedicated smartcard chip;
in response to authenticating the internal secure element, operably deactivating the internal secure element via the dedicated smartcard chip, wherein deactivating the internal secure element includes disconnecting from the internal secure element; and
with the dedicated smartcard chip, operably verifying an active/inactive status of the secure element without access to inherent content and data in the secure element.

2. The near field communication device according to claim 1, wherein the antenna is on a daughterboard connected to a motherboard on which the battery is connected.

3. The near field communication device according to claim 1, wherein the touch-screen is a color LCD display and an associated touch-panel.

4. The near field communication device according to claim 1, wherein a specific power management module powers up the near field communication device with a stabilized voltage, a front-end controller main power pin is connected to the power module and, in order to take advantage of a battery off mode, the secure element has a power pin that is connected to a front-end controller pin.

5. The near field communication device according to claim 1, wherein a front-end controller battery pin is connected to the battery in order to have the near field communication feature available even if the device is powered off.

6. The near field communication device according to claim 1, wherein the dedicated smartcard chip is a generic micro-controller programmed with a firmware to interface the host central processing unit or microcontroller unit.

7. The near field communication device according to claim 1, wherein the near field communication device layout comprises a thin-film transistor layer connected to a printed circuit board motherboard connected to a printed circuit board antenna daughterboard and to the battery, and wherein the antenna is connected to the thin-film transistor layer and to the printed circuit board motherboard.

8. The near field communication device according to claim 1, further comprising a software components stack broken into two subcomponents: a host controller interface layer, which implements a protocol related to smartcard command via a driver, and a NFC Forum specification layer with a card emulation, NDEF Emulation and a peer-to-peer module.

9. The near field communication device according to claim 8, wherein the NFC Forum specification layer provides applications in two kinds of components: at least one service application that implements a given service, and a service application manager that manages the at least one service application.

10. A connection system of near field communication devices, the system comprising:
a host central processing unit or microcontroller unit;
a memory;
a general packet radio service modem controlled by the central processing unit or microcontroller unit to access the Internet;
a subscriber identification module holder; and
a battery, the near field communication devices further comprising:

a touch-screen adapted to operate a contactless application;
visualize a ticket/coupon; and
consult the latest transaction or equivalent;
a secure element adapted to store and execute the contactless application;
a near field communication front-end controller connected to the central processing unit or microcontroller unit and to the secure element;
the near field communication devices being connected to the Internet by mobile connection and by general packet radio service connection to a backend server to manage application download on the secure element of the near field communication devices and, when a new user subscribes to a service, the contactless application is downloaded to the secure element and a user interface is downloaded to the near field communication device of the new user;
an external secure module being connected to the secure element as an internal secure element to realize two-level security;
in response to identifying the internal secure element, the external secure module activating the internal secure element via a smartcard chip; and
in response to authenticating the internal secure element, operably deactivating the internal secure element via the smartcard chip, and the smartcard chip verifying an active/inactive status of the internal secure element without access to content and data in the secure element, wherein deactivating the internal secure element includes disconnecting from the internal secure element.

11. The near field communication device according to claim 10, wherein, the smartcard chip and the secure element define a double level of security: the internal security by the secure element and the external security by the smartcard chip.

12. The connection system according to claim 10, further comprising:
a power management module powering up at least one of the near field communication devices with a stabilized voltage;
a front-end controller main power pin connected to the power module; and
in order to take advantage of a battery off mode, the secure element having a power pin that is connected to the front-end controller pin.

13. The connection system according to claim 10, further comprising a front-end controller battery pin connected to the battery in order to have near field communication available even if at least one of the devices is powered off.

14. A near field communication device comprising:
a host central processing unit or microcontroller unit;
a radio service modem controlled by the central processing unit or microcontroller unit;
a subscriber identification module holder;
a battery;
a touch-screen adapted to operate a contactless application, visualize an e-ticket, visualize an e-coupon, visualize an e-parking card, and consult a bank transaction;
a secure memory adapted to store and execute the contactless application;
a near field communication front-end controller connected to the central processing unit or microcontroller unit and to the secure memory;
the near field communication device being adapted for mobile connection to the Internet by the radio service modem which is adapted for connection to a backend server to manage downloading of the contactless application on the secure memory;
if a new user subscribes to a service, the contactless application downloading to the secure memory and a user interface downloading to the near field communication device of the new user;
a smartcard chip;
an external secure service application manager, containing a bank-payment key and bank transaction data, activating the secure memory via the smartcard chip in response to identifying the secure memory and deactivating the secure memory via the smartcard chip in response to authenticating the secure memory, wherein deactivating the secure memory includes disconnecting from the secure memory, and wherein the smartcard chip verifies an active/inactive status of the secure memory without access to content and data in the secure memory;
a front-end controller battery pin connected to the battery in order to have the near field communication feature available even if the device is powered off;
an external smartcard reader, the secure memory including manufacturer-set inherent internal security keys, and the secure memory operably communicating with the external smartcard reader regarding the bank-payment key; and
an antenna, the host unit, the secure memory and the battery being part of a portable communicator.

15. The near field communication device according to claim 14, wherein the antenna is on a daughterboard connected to a motherboard to which the battery is connected.

16. The near field communication device according to claim 15, wherein the touch-screen is a color LCD display and an associated touch-panel.

17. The near field communication device according to claim 14, being credit card sized, and the device further comprising a connecting cable operably recharging the battery, and the smartcard chip including a microcontroller which implements contactless communication.

18. The near field communication device according to claim 14, further comprising:
a power management module operably powering up the near field communication device with a stabilized voltage; and
a front-end controller main power pin connected to the power management module and, in order to take advantage of a battery off mode, the smartcard chip including a power pin connected to a front-end controller pin.

19. The near field communication device according to claim 14, further comprising:
a server;
a service application operably registering with the service application manager for near field communication activity; and
when a point of sale unit sends data to a card application, the service application manager starting the service application which sends a notification to the server.

20. The near field communication device according to claim 14, wherein the portable communicator is a smartphone and the security keys are associated with a duplet application including one store in an operating system and another programmed in the secure memory.

* * * * *